United States Patent [19]

Homeyer

[11] Patent Number: 4,750,252

[45] Date of Patent: Jun. 14, 1988

[54] TOOL AND METHOD FOR INSTALLING TWIST-ON ROD GUIDES

[75] Inventor: Gregory M. Homeyer, McAllen, Tex.

[73] Assignee: Conoco Inc., Ponca City, Okla.

[21] Appl. No.: 14,898

[22] Filed: Feb. 12, 1987

[51] Int. Cl.[4] .................. B23P 19/02

[52] U.S. Cl. .................. 29/426.6; 29/235; 29/236; 29/267; 29/453; 294/19.1

[58] Field of Search .............. 29/235, 236, 267, 426.5, 29/426.6, 450, 453; 81/488; 166/77.5, 78, 85; 254/131, 25, 30, 31, 132; 294/19.1; 7/166

[56] References Cited

U.S. PATENT DOCUMENTS

| | | | |
|---|---|---|---|
| 563,848 | 7/1896 | Dunham | 81/52 |
| 593,377 | 11/1897 | Johnson . | |
| 1,299,294 | 4/1919 | Buchanan | 254/30 |
| 1,689,585 | 10/1928 | Haschart | 7/12 |
| 1,736,585 | 11/1929 | Fehlhaber | 254/132 |
| 2,539,262 | 1/1951 | Moore | 81/90 |
| 2,576,000 | 11/1951 | Cowan, Jr. | 81/3.46 |
| 2,597,381 | 5/1952 | Roper | 29/229 |
| 2,619,862 | 12/1952 | Trypanis | 81/119 |
| 2,640,382 | 6/1953 | Grossman | 81/119 |
| 2,896,910 | 7/1959 | Cooper et al. | 254/131 |
| 3,090,115 | 5/1963 | Carr | 29/450 |
| 3,327,377 | 6/1967 | German | 29/426.5 X |
| 3,587,121 | 6/1971 | Morrow | 7/12 |
| 3,887,985 | 6/1975 | Zenon | 29/267 |
| 4,240,658 | 12/1980 | Britson | 294/19.1 |
| 4,245,709 | 1/1981 | Manuel | 175/325 |
| 4,575,163 | 3/1986 | Sable | 308/4 A |
| 4,622,869 | 11/1986 | Lee | 81/52 |

FOREIGN PATENT DOCUMENTS

| | | | |
|---|---|---|---|
| 653841 | 12/1962 | Canada | 294/19.1 |

*Primary Examiner*—P. W. Echols
*Assistant Examiner*—Andrew E. Rawlins
*Attorney, Agent, or Firm*—Richard K. Thomson

[57] ABSTRACT

A tool and method for installing and removing twist-on rod guides onto and off from sucker rods. A partially closed C-shaped jaw member lying substantially in a first plane surrounds the guide and the sucker rod allowing torque to be applied to the rod guide to enable it to be snapped onto or off from the sucker rod. A pry bar and handle are attached to the jaw member and lie substantially in a second plane that forms preferably about a 20° angle with the first plane. A linear projection of the pry bar into the first plane projects from the edge of the lower jaw at a right angle.

10 Claims, 2 Drawing Sheets

TOOL AND METHOD FOR INSTALLING TWIST-ON ROD GUIDES

FIELD OF THE INVENTION

The present invention relates to the field of oil well equipment. More particularly, the present invention is directed to a tool to facilitate the method for installation and removal of twist-on rod guides onto and off from sucker rods.

BACKGROUND AND SUMMARY OF THE INVENTION

In secondary recovery wells, i.e., those employing some form of a pump, a sucker rod typically extends between the downhole pump and the "rocking horse" actuator on the surface. The sucker rod is vertically reciprocated in the tubing string by the rocking horse to actuate the pump. In order to center the rod in the tubing string, twist-on guides are snapped onto the rod. These rod guides are typically made of rubber nylon and perform a secondary function of transferring the wear to the bushing-like rod guide rather than permitting the rod itself to wear as a result of the friction between the stationary tubing and moving rod. In addition, the softer, self-lubricating rod guides reduce abrasion of the tubing string itself. The twist-on rod guide comprises a generally cylindrical bushing with tapered top and bottom ends having a front and back and a first axially extending aperture or throughbore. The first axially extending aperture intersects front of the guide and defines a first axially extending slot. Further, the first aperture intersects the back of the guide and defines a second axial slot. A second diagonally extending aperture interconnects said first and second slots.

Under current practice, the rod guides, which of necessity fit snugly on the sucker rod in order to prevent riding up the rod, are hammered into position on the sucker rod and then, when replacement is necessary, hammered off the rod. In addition to the potential damage to the rod guide involved with this method, there is potential damage to the rod itself as a result of an errant hammer blow or one that is more forceful than necessary. A damaged, i.e., dented or bent, sucker rod section must then be changed out with associated expense and lost production time.

The present invention is directed to a simple, yet effective, tool and method for installing twist-on guides onto, and removing worn guides off from, sucker rods. A first C-shaped plate member has first and second parallel arms with rod guide engaging surfaces and lies substantially in a first plane. A pry bar is affixed to one edge of the second arm. A projection of the pry bar into the plane of the plate member forms a right angle with the edge of the arm. The pry bar lies in a second plane that forms an angle, preferably about 20°, with the plane of the plate member. A handle forms an extension of the pry bar.

In use, the applicator tool of the present invention is positioned with the first and second arms of the plate member surrounding the rod guide and the sucker rod, the diagonally extending slot of the guide receiving said rod. The engaging surfaces are simultaneously brought into contact with a first portion of a back side of the rod guide opposite the first axial slot that is above the diagonal slot and a second portion of the back side opposite a second axial slot that is below the diagonal slot. By applying a downward force to the handle and/or pry bar, the centerline of the axial opening or aperture in the rod guide is brought into alignment with the centerline of and snapped onto the sucker rod. To remove a worn guide, the tool is reversed and the engaging surfaces of the tool brought into contact with a first pair of surfaces strattling the first axial slot and a second pair of surfaces strattling the second axial slot. By exerting upward force on the pry bar or handle, the guide can be snapped off the sucker rod and replaced with a new one as detailed above.

Various other features, advantages and characteristics will become apparent after a reading of the following detailed description.

DETAILED DESCRIPTION OF THE PREFERRED EMBODIMENT(S)

Figure 2:
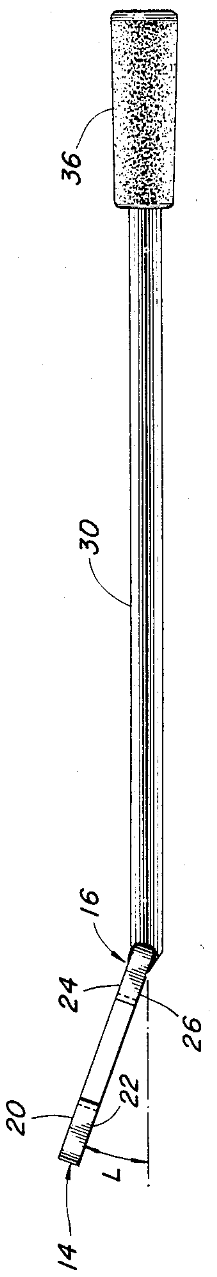
FIG. 2 is a side view of the tool of the present invention.
Figure 1:
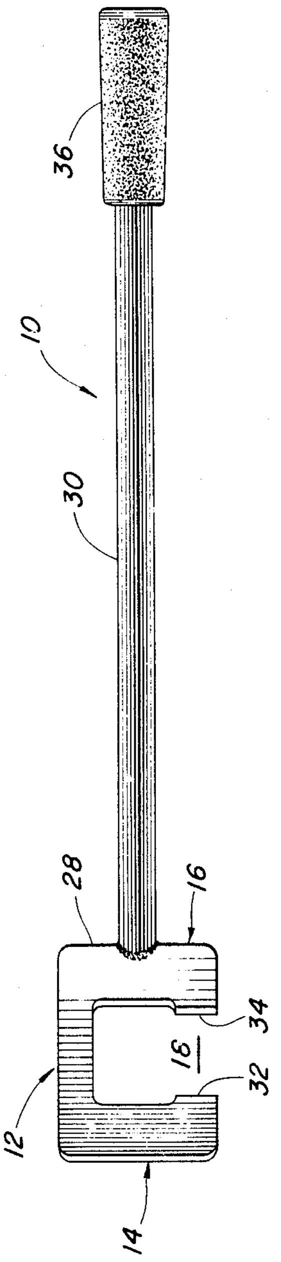
FIG. 1 is a top view of the twist-on rod guide applicator tool of the present invention.

One embodiment of the installation tool of the present invention is depicted in FIGS. 1 and 2 generally at 10. Tool 10 comprises a C-shaped, generally flat plate member 12 which lies substantially in a first plane. First laterally extending arm 14 and second laterally extending arm 16 define a rod guide-receiving opening 18. First arm 14 has an upper guide-engaging surface 20 and a lower guide-engaging surface 22. Second arm 16 has an upper guide-engaging surface 24 and a lower guide-engaging surface 26.

Pry bar 30 is attached to edge 28 of second arm 16 with pry bar 30 extending upwardly out of the plane of plate member 12 (FIG. 2). The angle $\alpha$, the angle between the plane of plate member 16 and the plane of pry bar 30, is preferably about 20°. This angularity has been shown to be effective at providing both adequate leverage and convenient reach, as discussed herebelow. A projection of pry bar 30 into the plane of plate member 12 forms a right angle with edge 28 (see FIG. 1). The slight closure between surfaces 32 and 34 of plate member 12 eliminates the tendency of the tool to slip off the surface of rod guide 40 when in operative engagement. A handle 36 is attached to pry bar 30 and, most preferably, forms a coplanar, colinear extension thereof.

Tool 10 is adapted to install and remove twist-on guides such as that shown at 40 (FIGS. 3 and 4) onto and off of s sucker rod 44. The rod guides may be of the same general type described in U.S. Pat. No. 4,575,163, hereby incorporated by reference. Rod guide 40 comprises a generally cylindrical member with tapering top and bottom ends and which has an axial throughbore or first aperture 42 that operatively engages sucker rod 44. A diagonally-extending slot or second aperture 46 intersects both a first axially extending slot 48 formed in front 50 of guide 40 and a second axially extending slot 52 formed in back 54 of guide 40. First axially extending slot 48 is formed in front 50 by first axial aperture 42 and extends only above diagonal aperture 46. Second axially extending slot 52 is also formed by first axial aperture 42, in the back 54 of guide 40.

In use, diagonally extending slot 46 of guide 40 is placed around sucker rod 44. Opening 18 in tool 10 is positioned around guide 40 and rod 44 with the upper guide-engaging faces 20 and 24 extending downwardly and lower guide-engaging surface 22 contacting a first portion 56 of back 54 of guide 40 opposite first slot 48 above diagonal slot 46. Upper guide-engaging surface 24 simultaneously engages a second portion 58 of front side 50 of guide 40 opposite second slot 52 below diagonal slot 46. By applying sufficient torque to prying bar 30 and/or handle 36, the axis of first axial aperture 42 will be twisted until it is coaxial with the axis of sucker rod 44 snapping rod guide 40 onto sucker rod 44.

Figure 4:
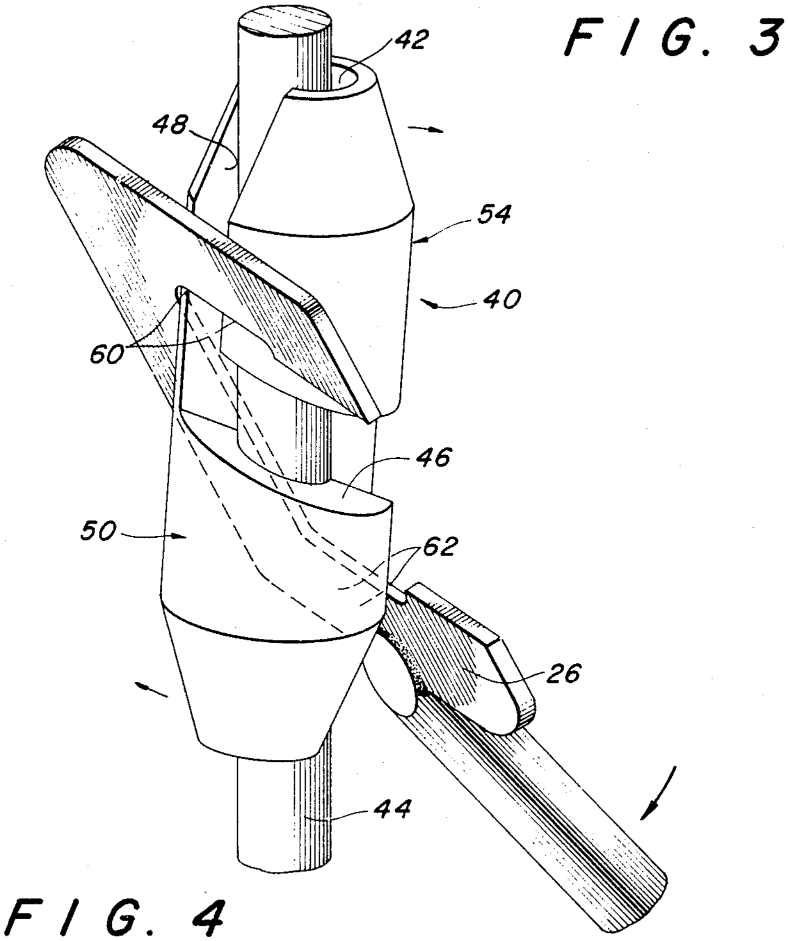
FIG. 4 is a pictorial schematic of the tool of the present invention being used to remove a guide from a sucker rod.

To remove a work guide from sucker rod 44, the procedure is reversed (FIG. 4). Upper guide-engaging surface 20 of arm 14 of tool 10 is brought into contact with a first pair of surfaces 60 on front side 50 either side of first axial slot 48 above diagonal slot 46. Lower guide-engaging surface 26 of arm 16 is simultaneously brought into engagement with a second pair of surfaces 62 on back side 54 on either side of second axial slot 52 below diagonal aperture 46. By applying sufficient torque to the rod guide 40 (i.e., by prying upwardly on pry bar 30 and/or handle 36), the axis of rod guide 40 will be misaligned with the axis of the sucker rod 44, snapping the work guide off of the rod and enabling a new guide to replace it.

Figure 3:
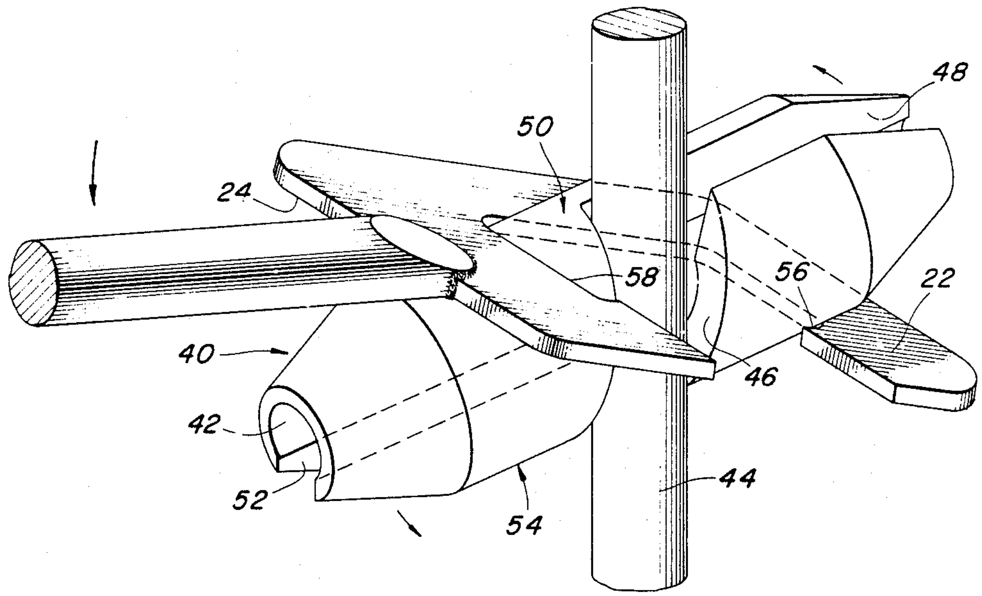
FIG. 3 is a pictorial schematic of the tool shown being used to install a rod guide on a sucker rod.

The benefits of angulating pry bar 30 with respect to laterally extending arms 14 and 16 can be clearly seen in FIGS. 3 and 4. By appropriately manipulating the tool 10 to position either guide-engaging surfaces 22 and 26 upwardly (FIG. 3) or guide-engaging surfaces 20 and 24 upwardly (FIG. 4), the angle that pry bar 30 forms with sucker rod 44 can be reduced. Generally, this will afford better leverage and easier reach. However, should the position of the rod guide be lower than normal for the installation or higher than normal for a removal, the tool can be rolled over from the position shown in FIGS. 3 and 4 to facilitate reaching and manipulating the rod guides.

Various changes, alternatives and modifications will become apparent to one of ordinary skill in the art following a reading of the foregoing specification. It is intended that all such changes, alternatives and modifications as come within the scope of the appended claims be considered part of the present invention.

I claim:

1. A tool for installing and removing a twist-on guide onto and off from a sucker rod by simultaneously engaging first and second lateral portions on opposite ends and opposing sides of said guide, said tool comprising:

(a) a generally C-shaped plate member lying substantially in a first plane with an opening formed in one lateral face for receiving said twist-on rod guide and said sucker rod, a first laterally extending arm and a second laterally extending arm of said C-shaped plate member defining said opening, said first and second laterally extending arms being generally parallel and each having upper and lower surfaces for engaging said first and second opposing lateral portions of said twist-on guide at first and second different axial extents, said upper or lower surface of said first laterally extending arm engaging said first opposing lateral portion as said lower or upper surface of said second laterally extending arm is simultaneously engaging said second opposing lateral portion;

(b) a pry bar attached to a lateral edge portion of said second laterally extending arm, said pry bar lying in a second plane different from said first plane for facilitating the simultaneous application of torque to said first and second opposing lateral portions of said twist-on guide, a projection of said pry bar into the first plane of said plate member forming substantially a right angle with said edge portion of said second arm; and (c) a handle.

2. The tool of claim 1 wherein said handle forms an extension of said pry bar.

3. The tool of claim 1 wherein said handle lies in substantially the same plane as said pry bar.

4. The tool of claim 1 wherein the plane containing the C-shaped plate member forms an angle of 20° with the plane containing said pry bar.

5. A method of installing a twist-on rod guide onto a sucker rod, or the like, said sucker rod having an axial centerline, said rod guide comprised of a generally cylindrical member with inwardly tapering top and bottom ends having front and back sides and a first axially extending aperture and a second diagonally extending aperture intersecting said first aperture and extending from a first side to a second side of said twist-on rod guide, said first aperture having an axial center-line and a first portion of said first aperture which intersects said front side and defines a first axially extending slot above said second diagonally extending aperture, a second portion of said first aperture intersecting said back side and defining a second axially extending slot below said second diagonally extending aperture, said second diagonally extending aperture interconnecting said first and second axially extending slots, said method comprising:

(a) positioning said diagonally extending slot parallel to and in generally overlying relationship to said sucker rod;

(b) simultaneously engaging (i) a first portion of the back side of said twist-on rod guide that is opposite said first axially extending slot and above said second diagonally extending aperture and (ii) a second portion of the front side of said twist-on rod guide that is opposite said second axially extending slot and below said second diagonally extending aperture;

(c) exerting sufficient torque to said first and second engaged portions to bring the centerline of said first axially extending aperture into alignment with the centerline of said sucker rod thereby snapping the rod guide onto said sucker rod.

6. The method of claim 5 wherein the simultaneous engagement of step (b) is performed by cooperating portions of a single tool.

7. The method of claim 5 wherein the torque exerted in step (c) is exerted by a single application of uni-directiontional force.

8. A method of removing a twist-on rod guide from a sucker rod, or the like, said sucker rod having an axial centerline, said rod guide comprised of a generally cylindrical member with inwardly tapering top and bottom ends and having a front and back sides and a first axially extending aperture and a second diagonally extending aperture intersecting said first aperture and extending from a first side to a second side of said twist-on rod guide, said first aperture having an axial centerline and a first portion of said first aperture which intersects said front side and defines a first axially extending slot above said second diagonally extending aperture, a second portion of said first aperture intersecting said back side and defining a second axially extending slot below said second diagonally extending aperture, said second diagonally extending aperture interconnecting said first and second axially extending slots, the centerline of said twist-on rod guide being, initially, generally co-extensive with the centerline of said sucker rod, said method comprising:

(a) simultaneously engaging (i) a first pair of surfaces on the front of said twist-on rod guide that are above said second diagonally extending slot and on either side of said first axially extending slot, and (ii) a second pair of surfaces on the back of said twist-on rod guide that are below said second diagonally extending slot and on either side of said second axially extending slot;

(b) exerting sufficient torque to said twist-on rod guide at said first and second engaged portions to misalign said axial centerline of said twist-on rod guide with said axial centerline of said sucker rod thereby snapping said twist-on rod guide off of said sucker rod.

9. The method of claim 8 wherein the simultaneous engagement of step (a) is performed by cooperating portions of a single tool.

10. The method claim 8 wherein the torque exerted in step (b) is exerted by a single application of unidirectional force.

* * * * *